Figure 1:
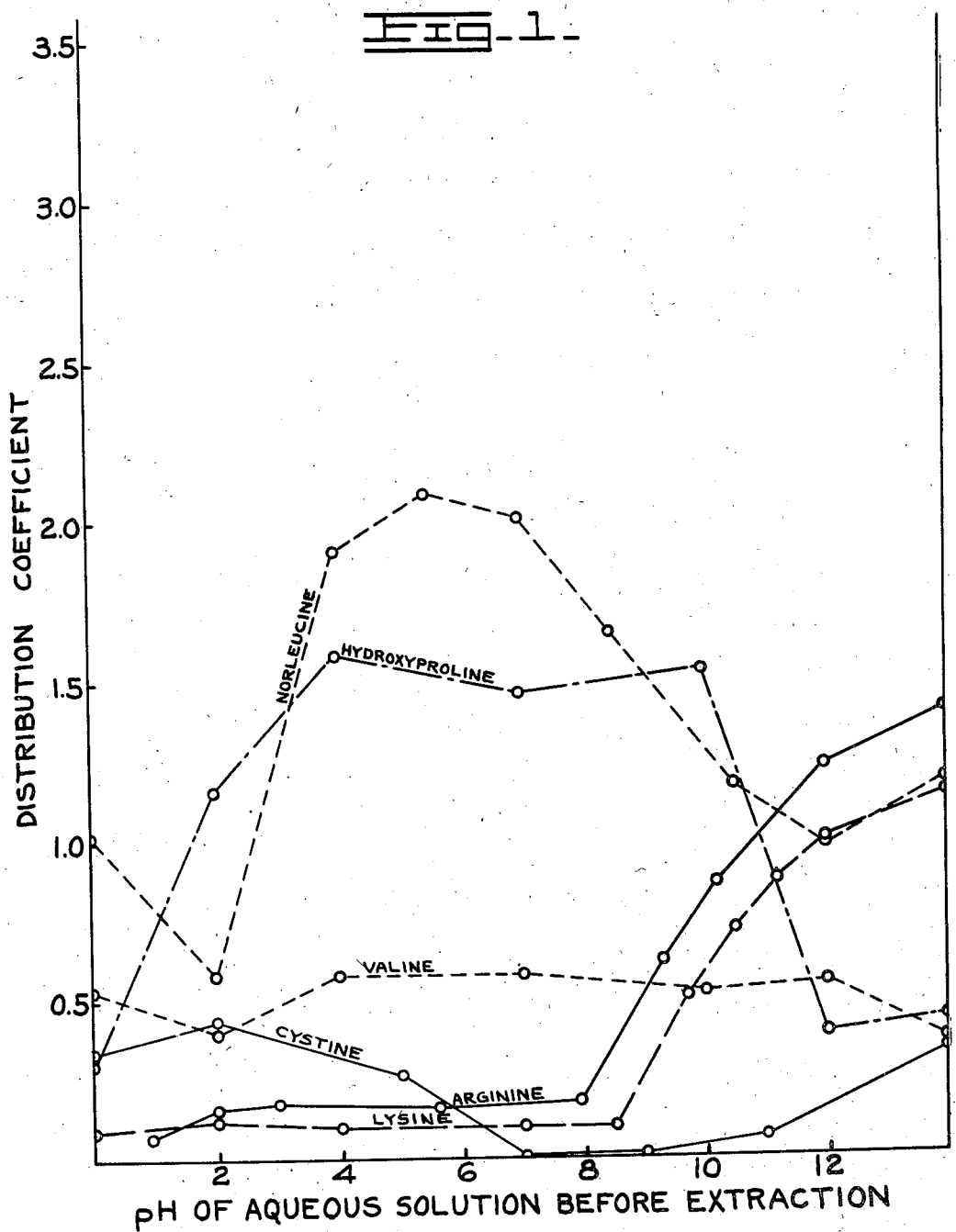

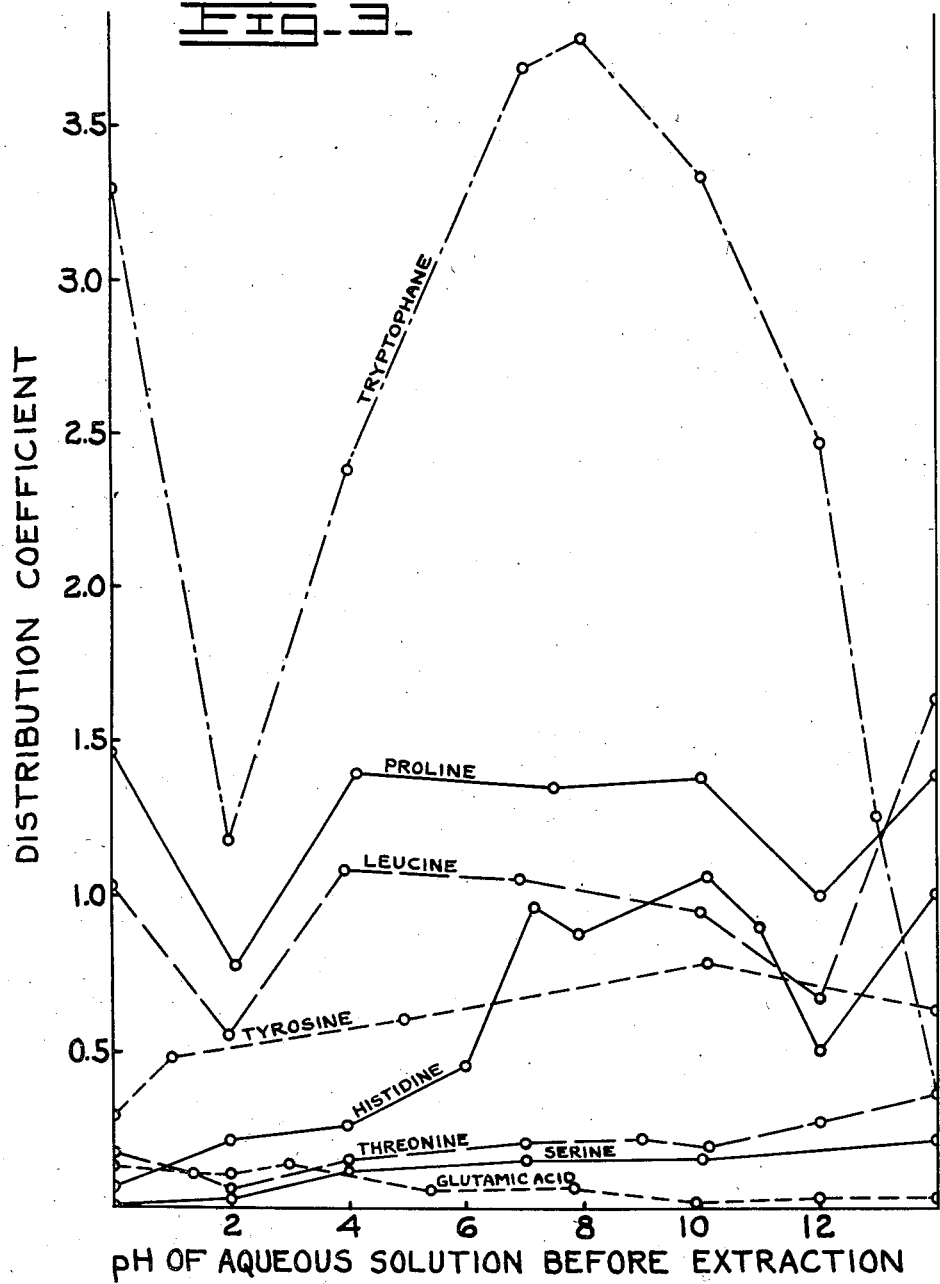

Patented May 24, 1949

2,471,053

UNITED STATES PATENT OFFICE 2,471,053

AMINO ACID EXTRACTION

Herman J. Almquist and John Gorton Davis, Berkeley, Calif., assignors to F. E. Booth Company Inc., San Francisco, Calif., a corporation of Nevada Application February 15, 1946, Serial No. 647,961

5 Claims. (Cl. 260—529)

Our invention relates to the separation of amino acids by extraction, and more particularly to a method of obtaining amino acid concentrates from a protein hydrolysate.

These acids or their concentrates are, among other purposes, valuable in the fortification of foods the proteins of which are deficient in one or more of the amino acids. Various methods have been employed heretofore for obtaining such acids. These methods which include chemical precipitants, the so-called Fischer esterification method, butyl alcohol extraction, electrical transport method, and adsorption of the amino acids by various solids such as ion exchange agents, are not all to be desired from a commercial viewpoint because they have one or more of the disadvantages of being too slow, costly, incomplete in recovery of the acids, or causing destruction or fouling of the amino acids.

Our invention is designed to overcome the foregoing difficulties; and it has its objects, among others, the provision of an improved amino acid separation method, which is economical, relatively rapid and efficient in the recovery of such amino acids, and which readily produces a desired amino acid concentrate from which the extracted amino acids may be recovered, or which may be used as such in the fortification of food proteins. Other objects of our invention will become apparent from a perusal of the following description thereof.

In our method, a protein hydrolysate is first prepared according to any of the well known procedures which will produce an aqueous solution of the various amino acids. In this hydrolysate, the amino acids are liberated from their source of protein material, and from combination with each other. In this connection, the source of the protein may be any of the usual protein materials, such as, for example, meat, vegetable protein such as soy-bean and other legumes, fish meal, milk and gelatin.

Where the source of the material is essentially a protein, such as meat, the hydrolysate can be prepared directly therefrom by any suitable procedure, such as chemical or enzymatic digestion. Where the protein bearing material contains other combined compounds, such as starch which exists in soy-bean, the splitting of the protein into its ultimate units may be effected by the previously mentioned known procedures, such as treatment of the protein source with strong acids or bases under application of heat and steam pressure, or digestion with natural protein digesting enzymes. It is immaterial how the protein hydrolysate is obtained, as long as the amino acids are substantially free in their aqueous solution.

We have found that in such aqueous solution of amino acids, if the solution is treated with a suitable solvent for the amino acids which is relatively non-miscible with the water, various groups of the amino acids may be extracted selectively by controlling the hydrogen ion concentration (expressed as the pH) of the aqueous phase.

We have also found that the distribution of the amino acids between a water non-miscible solvent therefor, and an aqueous phase varies among the amino acids, and also with the pH of the aqueous phase, and by choosing various hydrogen ion concentrations, groups of individual amino acids may be highly concentrated either in the solvent or in the aqueous phase. This distribution is designated hereinafter as "Distribution Coefficient" which is the concentration of the amino acids that passes into the solvent phase divided by the concentration thereof which remains in the aqueous phase substantially at equilibrium between the phases. Thus, our invention enables selected concentrates of groups of amino acids to be readily obtained.

Figure 2:
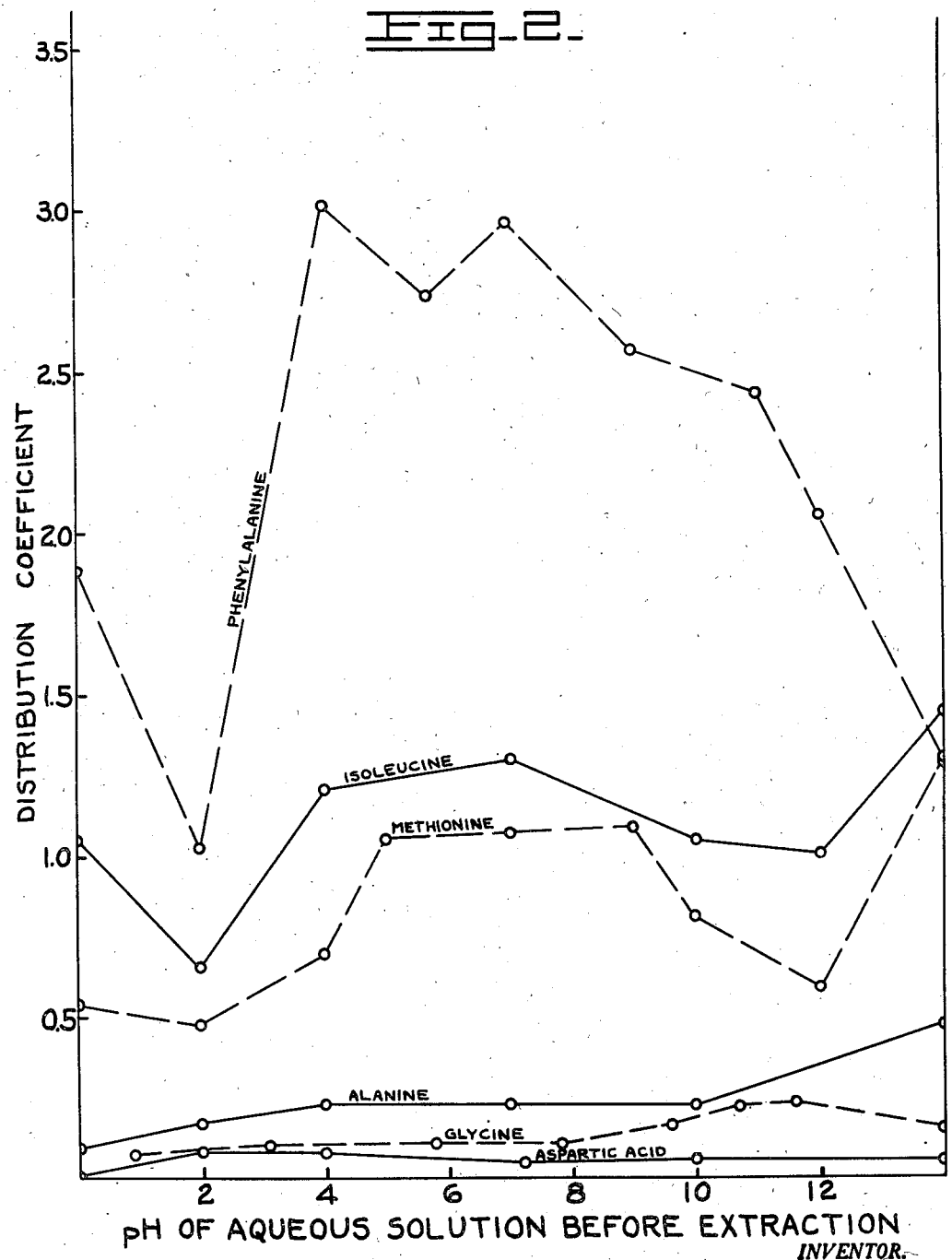

In the drawings:

Figs. 1, 2 and 3 are each graphs, all drawn to the same scale, illustrating the distribution coefficients of various amino acids at various hydrogen ion concentrations (pH), for the preferred amino acid solvent of our invention, namely, phenol, and water. The graphs are presented in the three separate figures, to obviate confusion of lines which would otherwise occur by presentation in one view.

The principle of the dependence of the distribution coefficient on pH, which we have found to exist, is not effected to any material degree by the volume of water in the hydrolysate or by the volume of solvent, but for commercial economy, it is desirable to have a relatively concentrated aqueous solution of the protein hydrolysate, and a minimum amount of solvent for the amino acids. As for the temperature of the extraction with the solvent, this is also relatively immaterial, as temperatures may be employed wherever convenient, between the freezing point of the system and the point of complete miscibility.

As the solvent for the amino acids, any suitable solvent may be employed which is a solvent therefor and which, at the same time, is substantially non-miscible with the water in which the amino acids are dissolved, so that when the solvent is added to the aqueous solution of the amino acids, two distinct and separable phases are formed, namely, a solvent phase and an aqueous phase. Also, the solvent should not be destructive of the amino acids.

Aliphatic, as well as aromatic, solvents may be employed. With respect to the aliphatic solvents, alcohols are preferred, and alcohols having four or more carbon atoms should be employed because those having less than four carbon atoms are highly miscible in water. Also, mono-hydroxy alcohols having four or more carbon atoms are preferred because they are least miscible in water. Butyl alcohol and amyl alcohol are illustrative of types of aliphatic solvents that may be employed.

As aromatic solvents, phenolic bodies including phenol itself, and substituted phenols, such as para-chlorophenol, ortho-cresol, meta-cresol, para-cresol, ortho-nitrophenol, meta-nitrophenol, and para-nitrophenol, are satisfactory. Phenol is our preferred solvent because it is relatively inexpensive, and is an efficacious solvent of the amino acids. Also, it is relatively non-miscible in water, and is easily recoverable upon distillation. Substantially pure phenol may be used and added directly to the protein hydrolysate but for commercial purposes, it is preferred to employ commercial phenol saturated with water.

For adjusting the pH of the aqueous protein solution to obtain the desired selective segregation of a desired group of amino acids therein, any suitable alkali or acid may be employed, such as hydrochloric, or sulfuric acids, if acidity or reduction of alkalinity is desired; or sodium or calcium hydroxides if it is desired to render the solution alkaline or decrease acidity thereof. This adjustment or control of the hydrogen ion concentration may be readily obtained by addition of the alkali or acid directly to the aqueous phase or solution, and taking pH readings by any conventional means. In this connection, with respect to the preferred solvent phenol, it is not practical to have an alkalinity of considerable extent beyond pH fourteen (14) because phenol, inasmuch as it is a very weak acid, begins to dissolve rapidly in a markedly alkaline aqueous phase, and phase separation will thus be impeded if not prevented.

The dissolving of phenol in the strongly alkaline aqueous phase will somewhat reduce the original pH of the aqueous phase which is plotted as the abscissa of Figs. 1, 2 and 3. Nevertheless, the distribution ratio found, varies with the pH of the aqueous phase as established prior to the contact with phenol; and it has been found most instructive and convenient to plot or express the abscissa in terms of original pH. The effect of contact with phenol on the pH, of only weakly alkaline or neutral or acidic aqueous phases has been found to be negligible for the purposes of this invention. In the presence of sufficient concentration of solubles in the aqueous phase, separation of phases is readily obtained between phenol and the aqueous phases at original pH values as high as 14. These solubles may be the amino acids, or salts, such as potassium chloride, which increase the specific gravity of the aqueous phase and also exert a "salting-out" effect on the phenol.

After the desired amino acid solvent is added to the aqueous solution of the amino acids at the desired pH, the mixture is agitated and the non-aqueous solvent phase is allowed to separate from the water phase and will contain a fixed proportion of the amino acids, depending upon the distribution coefficient at the particular pH of extraction. The non-aqueous solvent phase may be separated from the aqueous phase by any one of conventional methods for effecting separation of non-miscible liquids, such as by a separatory funnel, or by centrifuging. The residual aqueous phase will still contain some dissolved amino acid, but by repeated extractions with the described non-aqueous amino acid solvent, substantially all of the desired amino acid group will be extracted by such solvent.

Thus, by this method of extraction, a desired group of amino acids can be collected in the non-aqueous solvent, and recovery thereof may be effected by any suitable method. For example, the solvent may be distilled off by steam distillation until a highly concentrated solution of the amino acids obtains therein; and then the amino acids may be precipitated therefrom by any suitable method, such as by seeding, or preferably by the use of any suitable reagent such as picric acid, mercuric salts, or flavianic acid, which will form insoluble compounds of the amino acids, or the solvent may be substantially distilled off leaving the amino acid concentrate. These procedures lend themselves readily to recovery of the non-aqueous solvent by conventional methods.

From the preceding, it is seen that the described extraction method of our invention possesses the decided advantage of producing a desired amino acid concentrate easily and economically. This enables segregation of the individual amino acids quite easily by any of the well known chemical separation methods applicable to individual amino acids. Such separation is, otherwise, difficult to obtain from dilute solutions.

In Figs. 1, 2 and 3, we have illustrated graphically the distribution coefficient of various amino acids at various original hydrogen ion concentrations for our preferred solvent, namely, phenol, and water. It will be observed from these graphs that many of the amino acids have marked maximum distribution coefficients in a fixed pH range, which fact enables the selective segregation, and concentration of these amino acids according to our invention. For example, tryptophane has its maximum distribution coefficient at a pH of about eight (8). Proline, isoleucine and methionine also have substantially maximum distribution coefficients at about this range. As a result, these amino acids, for example, may be obtained highly concentrated by the method of our invention, from an amino acid hydrolysate containing other amino acids, the distribution coefficients of which are at a maximum at a pH other than about eight (8), or which remain relatively low and less variable with pH.

The results for amino acids such as lysine and arginine are quite striking inasmuch as they have a marked maximum distribution coefficient at substantially pH fourteen (14), while up to a pH of about eight (8), there is very little material difference in their relatively low distribution coefficients. Thus, for example, in a protein hydrolysate containing lysine, arginine and tryptophane, not only can a high concentrate of arginine and lysine be obtained by the method of our invention, but these two can be relatively segregated from the tryptophane by extracting the latter first at a pH of about eight (8) and then extracting the arginine and lysine at a pH of about fourteen (14). In a like manner, other amino acids or groups of amino acids can be segregated by taking advantage of the variation of their distribution coefficients according to variations of the hydrogen ion concentrations in the aqueous phase.

Even though certain of the amino acids show maximum distribution coefficients at about the same pH range, where there is a sufficient difference in the magnitude of these coefficients, as between those of tryptophane and of proline, for example (Fig. 3), separation of such amino acids may be readily effected by the known procedures of countercurrent extraction or multiple contact. In this connection, reference is made to the procedures described by T. G. Hunter and A. W. Nash, in Industrial and Engineering Chemistry, volume 27, No. 7 (1935), pages 836 to 845, involving multiple contact, and multiple fractional distribution (countercurrent extraction).

In addition to Figs. 1, 2 and 3, Table I is presented below, which presents some distribution coefficients measured at acid strengths which are in effect extensions of the data of Figs. 1, 2 and 3 to the left of the ordinates, and into the region of stronger acid concentrations, or pH values less than zero (0). In this respect, a pH of zero (0) corresponds substantially to a one (1) normal solution of a strong acid, such as hydrochloric.

From the table it can be observed that the distribution coefficients for some amino acids vary materially on the strong acid side. With respect to amino acids of this character, distribution coefficient data are given for two degrees of acidity, namely, for two (2) and five (5) normal acid solutions. In cases, where there is not such marked variation on the strong acid side, only one distribution coefficient or ratio is given. The table demonstrates that the principle of our invention is also applicable on the strong acid side.

TABLE

*Distribution ratios of amino acids between hydrochloric acid and phenol at 25° C.*

| | Acid Normality | Distribution Coefficient |
|---|---|---|
| Alanine | 2 | 0.07 |
| Arginine | 2 | 0.16 |
| | 5 | 0.21 |
| Aspartic Acid | 2 | 0.08 |
| Glutamic Acid | 2 | 0.00 |
| Glycine | 2 | 0.03 |
| Histidine | 2 | 0.02 |
| Isoleucine | 2 | 1.35 |
| | 5 | 1.64 |
| Leucine | 2 | 1.17 |
| | 5 | 1.10 |
| Lysine | 2 | 0.11 |
| | 5 | 0.00 |
| Methionine | 2 | 0.73 |
| | 5 | 1.05 |
| Norleucine | 2 | 1.67 |
| | 5 | 1.88 |
| Phenylalanine | 2 | 2.45 |
| | 5 | 2.80 |
| Serine | 2 | 0.06 |
| Threonine | 2 | 0.08 |
| Tryptophane | 2 | 3.29 |
| | 5 | 1.97 |
| Tyrosine | 2 | 0.00 |
| Valine | 2 | 0.55 |
| | 5 | 0.72 |
| Hydroxyproline | 2 | 0.25 |
| | 5 | 0.24 |
| Proline | 2 | 1.21 |
| | 5 | 1.19 |

The following data are illustrative of how the distribution coefficient of lysine between water and butyl alcohol varies with the pH, becoming greater toward the butyl alcohol with increase in pH.

| pH of Aqueous Phase | Distribution Coefficient of Lysine between Butyl Alcohol and Water |
|---|---|
| 8.0 | 0.006 |
| 9.0 | 0.007 |
| 9.7 | 0.008 |
| 10.0 | 0.010 |

Although the extraction of the lysine by the butyl alcohol is not nearly so great as by the phenol, it is to be observed that substantially the same principle obtains as with respect to our preferred phenol extraction.

In the previous description, we have referred to extracting the amino acids from the aqueous phase into the water non-miscible solvent phase. The separation of a particular amino acid or acids from the solvent phase may be also effected by obtaining some amino acids in the solvent phase at an optimal pH, by our described procedure, and then bringing such solvent phase in contact with a fresh or new substantially amino acid free (or one containing the amino acids being segregated) aqueous phase at a predetermined pH which will favor transfer of one or more of the amino acids back into such new aqueous phase from which they may be recovered. The stripped solvent can then be employed for further extraction at the original pH of the extracting operation.

This procedure simply entails employing the principle of our invention in reverse; and in employing it, it may be desirable to adjust the pH of the original aqueous phase so as to effect a minimum distribution into the solvent phase, whereby stripping of the solvent phase by contacting it with a new aqueous phase at a pH favoring return of a particular amino acid into such phase, is facilitated.

We claim:

1. In the extraction of an amino acid in an aqueous solution by phenol as an amino acid solvent, the step of adjusting the pH of the solution to a predetermined value to fix the distribution coefficient of said amino acid between the solvent and the water phases at a value enhancing such extraction of the amino acid by said solvent.

2. In the extraction of an amino acid in an aqueous solution, the steps of employing phenol as an amino acid solvent substantially non-miscible with the water, extracting an amino acid from the water phase by the solvent at a predetermined pH enhancing such extraction of the amino acid by said solvent, separating the solvent together with the extracted amino acid from the water phase, and then stripping such amino acid from the solvent by contacting the solvent with a fresh aqueous phase at a predetermined pH enhancing such stripping of the amino acid from said solvent.

3. The method of preparing an amino acid concentrate from an aqueous solution of such amino acid which comprises employing phenol as a solvent for the amino acid, and adjusting the pH of the solution to a predetermined value to fix the distribution coefficient of said amino acid between the solvent and the water phases at a value enhancing the extraction of the amino acid by such solvent.

4. The method of extracting preselected amino acids from an aqueous solution of a larger number of amino acids including such preselected acid, which comprises utilizing phenol as an amino acid solvent relatively non-miscible with the water whereby separable solvent and aqueous phases are formed, the relative distributions of the amino acids between said solvent and aqueous phases varying with the pH of the aqueous solution, utilizing such variation in distributions for effecting relative segregation between such selected amino acid and the remaining acids by adjusting the pH of the aqueous solution to a predetermined value to fix the distribution coefficient of such selected acid between said phases at a value enhancing extraction of such selected acid from the aqueous phase into the solvent phase, and separating the solvent together with such selected extracted amino acid from the aqueous phase.

5. The method of extracting preselected of amino acids from an aqueous solution of a larger number of amino acids including such preselected acid, which comprises utilizing phenol as an amino acid solvent relatively non-miscible with the water whereby separable solvent and aqueous phases are formed, the relative distributions of the amino acids between said solvent and aqueous phases varying with the pH of the aqueous solution, utilizing such variation in distributions for effecting relative segregation between such selected amino acid and the remaining acids by adjusting the pH of the aqueous solution to a predetermined value to fix the distribution coefficient of such selected acid between said phases at a value enhancing extraction of such selected acid from the aqueous phase into the solvent phase, separating the solvent together with such selected extracted amino acid from the aqueous phase, after said separation extracting other selected of the amino acids remaining in the aqueous phase by adjusting the pH of the aqueous phase to a predetermined value different from said aforementioned predetermined value to fix the distribution coefficient of such other preselected amino acid between said phases at a value enhancing such extraction of such other selected amino acid.

HERMAN J. ALMQUIST.
JOHN GORTON DAVIS.

REFERENCES CITED

The following references are of record in the file of this patent:

UNITED STATES PATENTS

| Number | Name | Date |
|---|---|---|
| 2,194,302 | Gerber | Mar. 19, 1940 |
| 2,222,993 | Toennies | Nov. 26, 1940 |

OTHER REFERENCES

Dakin, Jour. Biol. Chem., vol. 44, pp. 499–522 (1920).

Jones et al., Jour. Biol. Chem., vol. 79, pp. 429, 440 (1928).

Mitchell-Hamilton, "Biochem. of Amino Acids" (ACS Monograph #48, 1929), page 43.

Schmidt, "Chem. of the Amino Acids and Proteins," (pub. by Charles C. Thomas, 1938), pp. 142–146, 905, 913–926.

Block et al., "Amino Acid Composition of Proteins and Foods," Charles C. Thomas, page 288 (1945).